A. W. ROPER.
MACHINE FOR DRYING GRAIN.

No. 180,931. Patented Aug. 8, 1876.

ATTEST:
Robert Burus.
Le Blond Burdett

INVENTOR:
Alfred W. Roper
By Knight Bro.

UNITED STATES PATENT OFFICE.

ALFRED W. ROPER, OF ST. LOUIS, ASSIGNOR OF ONE-HALF HIS RIGHT TO JOE D. KEEBAUGH, OF GLASGOW, MISSOURI.

IMPROVEMENT IN MACHINES FOR DRYING GRAIN.

Specification forming part of Letters Patent No. 180,931, dated August 8, 1876; application filed July 1, 1876.

*To all whom it may concern:*

Be it known that I, ALFRED W. ROPER, of the city and county of St. Louis, State of Missouri, have invented certain new and useful Improvements in Machines for Drying Grain, &c., of which the following is a full, clear, and exact description, reference being had to the accompanying drawings, making part of this specification.

This invention is an improvement on Patent No. 131,464, granted to me September 17, 1872, for improvements in grain-driers.

The first part of my present invention consists in providing drying-pans (substantially similar to those of the former patent) with steam-coils for the heating of said pans. The object is to avoid the expense of making the pans strong enough to resist interior steam-pressure.

The second part of my improvement consists in forming said steam-coils with an inclination toward the center, so that the water of condensation will drain readily from the pipe.

The third part of my improvement consists in the manner of connecting the rakes to the driving-shaft. The rakes are hinged to collars adjustable on the shaft, the hinges allowing the rakes to rise over obstructions.

The fourth part of my improvement consists in forming the rim surrounding each alternate pan of hinged sections secured together by pins passing through eyes at the ends of said sections. The purpose is to allow the removal of the rim in the repair or adjustment of the rakes, &c.

Figure 1:
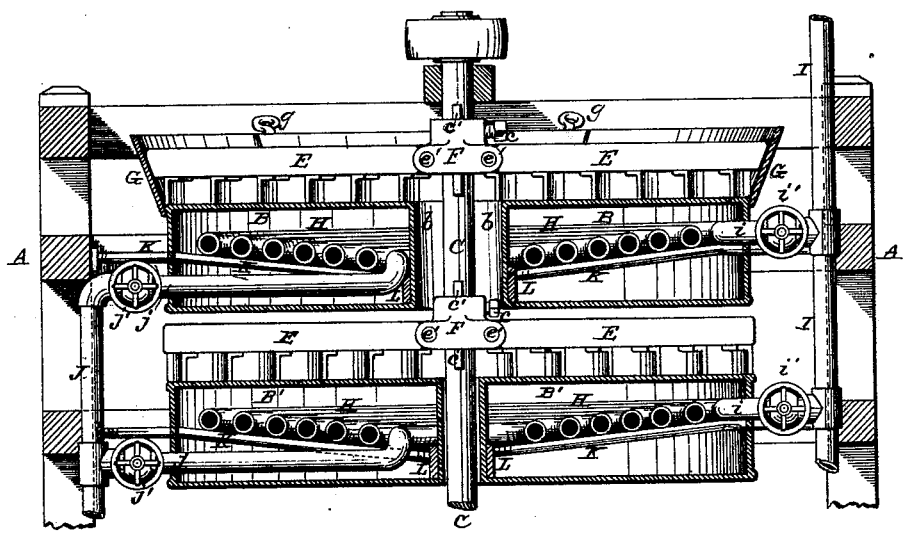
Figure 2:
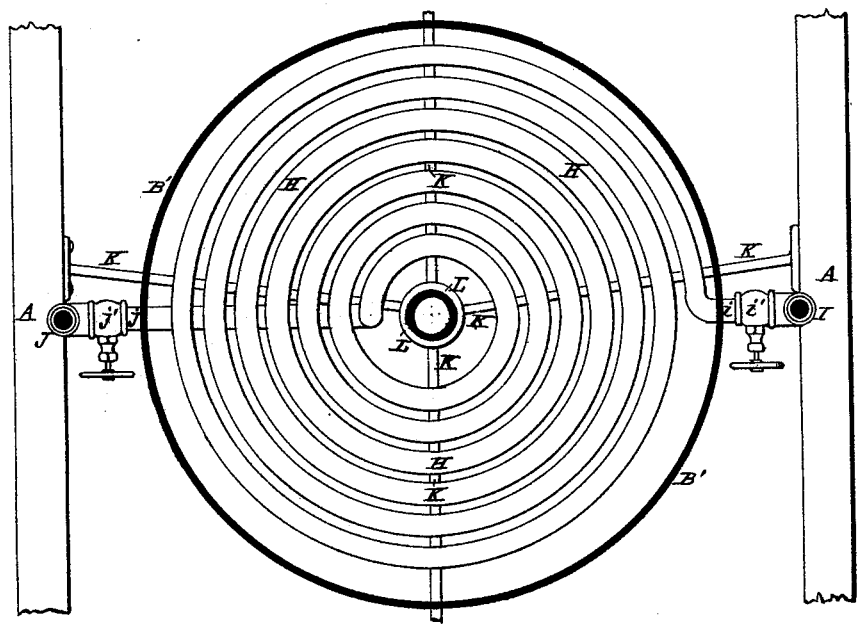
Figure 3:
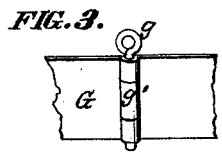

In the drawings, Figure 1 is an axial section at $x\ x$, Fig. 2. Fig. 2 is a horizontal section through one of the pans at $x'\ x'$, Fig. 1. Fig. 3 is a detail view of part of the sectional rim.

A is the frame of the drier, supporting the drying-pans B B', through the center of which passes the driving-shaft C, carrying the rakes E, the teeth of which are so inclined as to carry the grain inward and outward on alternate pans. The grain is carried inward on one pan and discharged through a central opening, $b$, and is carried outward in the next pan of the series and discharged over the edge into the pan beneath, as described in my patent hereinbefore cited.

The rakes are hinged to hubs F, the hinge $e'$ being vertical and allowing the rake to rise over obstacles, and to rise and fall according to the depth of grain in the pan. The hub F fits as a collar on the shaft, and may be adjusted thereon, and fixed in position by a set-screw, $c$. A feather, $c'$, on the shaft, C, prevents the turning of the rake-hubs F thereon.

The rim G surrounding each alternate pan B', is formed in sections, secured together by pins $g$ in lap-sockets $g'$, so as to allow the ready removal of the rim by the extraction of one or more of the pins $g$. The purpose of making the rim removable is to allow access to the parts between the pans. The frame A supports as many of the pans B B' as may be required. The lower pan discharges into a conveyer or other receptacle. The arrangement may be such that the grain may be carried from said receptacle to the upper pan, to be worked over again. The speed of the rakes may be varied, according to the kind or condition of the article being dried.

H is a coil of steam-pipe; one of such coils being provided for each of the pans B B'. The coil H is inclined downward toward the center, so that the water of condensation will flow out of the coil readily. I is the steam-supply pipe, having branches $i$ with valves $i'$. The branches connect with the coils H. J is the drain or water-discharge pipe, having branches $j$ with valves $j'$, said branches connecting with the lower ends of the coils.

This construction obviates the necessity of making the pans B B' steam-tight, and thus the cost of the machine is much lessened in the first instance, and the trouble and cost of repairs much lessened. The coils are supported on rods K, the outer ends of which are attached to the frame A, the inner end of each rod screwing into a ring, L, resting on the bottom of the pan B or B', as the case may be.

The grain or other material is supplied to the upper pan near its periphery, and carried inward to the central discharge, where it drops onto the pan B' beneath, on which it is carried outward and drops from the periphery of the pan onto the flaring edge G, and top of the pan beneath.

I claim as my invention—

1. The combination of the drying-pan B or B', rake F E, and steam-coil H, as and for the purpose set forth.

2. The rakes E, hinged at $e'$ to the hub F, in combination with the shaft C and pan B or B', substantially as and for the purpose set forth.

3. The sectional removable ring $g$, in combination with the fixed drying-pan B and rake E F, as and for the purpose set forth.

ALFRED W. ROPER.

Witnesses:
  SAML. KNIGHT,
  ROBERT BURNS.